US011988135B2

(12) United States Patent
Holland

(10) Patent No.: US 11,988,135 B2
(45) Date of Patent: May 21, 2024

(54) CLEANER, MORE EFFICIENT ENGINES

(71) Applicant: Ronald A. Holland, Carlsbad, CA (US)

(72) Inventor: Ronald A. Holland, Carlsbad, CA (US)

( * ) Notice: Subject to any disclaimer, the term of this patent is extended or adjusted under 35 U.S.C. 154(b) by 0 days.

(21) Appl. No.: 18/232,102

(22) Filed: Aug. 9, 2023

(65) Prior Publication Data

US 2024/0052777 A1 Feb. 15, 2024

Related U.S. Application Data

(60) Provisional application No. 63/397,159, filed on Aug. 11, 2022.

(51) Int. Cl.
*F02B 75/32* (2006.01)
*F02B 75/02* (2006.01)

(52) U.S. Cl.
CPC .............. *F02B 75/32* (2013.01); *F02B 75/02* (2013.01)

(58) Field of Classification Search
CPC ................................ F02B 75/32; F02B 75/02
USPC .... 123/48 AA, 48 B, 53.6, 78 B, 78 E, 78 F, 123/197.4
See application file for complete search history.

(56) References Cited

U.S. PATENT DOCUMENTS

| | | | | |
|---|---|---|---|---|
| 11,131,255 | B1 * | 9/2021 | Yuan | F02D 15/04 |
| 11,136,916 | B1 * | 10/2021 | Zhao | F01B 7/02 |
| 2001/0015192 | A1 * | 8/2001 | Urushihara | F02B 17/005 123/299 |
| 2015/0275777 | A1 * | 10/2015 | Bonner | F01B 9/06 123/90.15 |

* cited by examiner

*Primary Examiner* — Hai H Huynh
(74) *Attorney, Agent, or Firm* — AVERILL GREEEN & KIM; Kenneth L Green

(57) ABSTRACT

An internal combustion engines keeps the pistons at or near the End Of Stroke (EOS) for the whole time or most of the time that fuel is burning or while fuel is injected into the engine. A scotch yoke embodiment includes a curved slot to extend the piston's time at (EOS). A second embodiment includes a cam on the crankshaft and a follower. The shape of the cam extends the piston's time at (EOS).

20 Claims, 14 Drawing Sheets

CLEANER, MORE EFFICIENT ENGINES

CROSS-REFERENCE TO RELATED APPLICATIONS

The present application claims the priority of U.S. Provisional Patent Application Ser. No. 63/397,159 filed Aug. 11, 2022, which application is incorporated in its entirety herein by reference.

BACKGROUND OF THE INVENTION

The present invention relates in general to two strokes per cycle, direct fuel oil injected, internal combustion (IC) engines, and to a method of achieving a thermodynamic cycle of operation for these types of engines that provide, among other things, higher efficiency, more complete combustion, less fuel consumption, almost no harmful or hazardous emissions, and greater mechanical simplicity than prior art IC engines.

The motion of the pistons in Internal Combustion (IC) engines has always been directly related to the rotation of the crankshaft which means that the piston only remains at the top of its stroke for an instant. This creates a number of problems for creating high fuel efficiency and complete combustion from a direct fuel oil injected, IC engine. When the fuel is first injected into the combustion chamber the piston has not reached the top of its stroke therefore the crankshaft is being pushed in the wrong direction which reduces both power and fuel efficiency. Under full power as the piston starts moving down part of the fuel is still being injected and burning, reducing the expansion ratio and again the efficiency.

U.S. Pat. No. 10,287,971 in FIG. 1, discloses a single cylinder opposed piston, IC engine having pistons coming together to form a small spherical combustion chamber 34 with squeeze area on each side 36 and 38 to create a swirling charge of air in the chamber. However this is not totally effective since the fuel is injected before and after the most efficient condition exists because the pistons are only held together for an instant. Accordingly, the need exists for a direct fuel oil injected, IC engine cycle that overcomes the above described inefficiencies.

BRIEF SUMMARY OF THE INVENTION

The present invention relates in general to two strokes per cycle, direct fuel oil injected, IC engines, and to a new thermodynamic cycle of operation for these types of engines that provides, among other things, higher efficiency, more complete combustion, less fuel consumption, almost no harmful or hazardous emissions, and greater mechanical simplicity than prior art IC engines. It is not a Diesel cycle (constant pressure while burning), or a variation of the Diesel cycle which burns almost all of the fuel during the power stroke, it is a constant volume while burning cycle.

In accordance with one aspect of the present invention, there are provided new concepts of controlling the motion of the pistons in IC engines that can overcome many of the inefficiencies of the prior art. The pistons are coupled to a crankshaft to hold the pistons at or near End Of Stroke (EOS) for at least the time fuel is burned in the combustion chamber or at least the time fuel is injected into the combustion chamber, during maximum power generation.

In accordance with another aspect of the present invention, there are provided IC engines that replace the connecting rods with scotch yokes, including slots in the yokes where the bearings ride that are shaped differently than those in state of the art scotch yokes. Prior art scotch yokes have slots with straight sides perpendicular to the motion of the pistons which control the pistons in a conventional manor. In the present invention includes curved scotch yoke slots holding the pistons at or near EOS for an extended time period.

In accordance with yet another aspect of the present invention, there are provided IC engines including cams on crankshaft throws holding the pistons at or near EOS for an extended time period.

BRIEF DESCRIPTION OF THE SEVERAL VIEWS OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within ten percent of a stated value.

Figure 1:
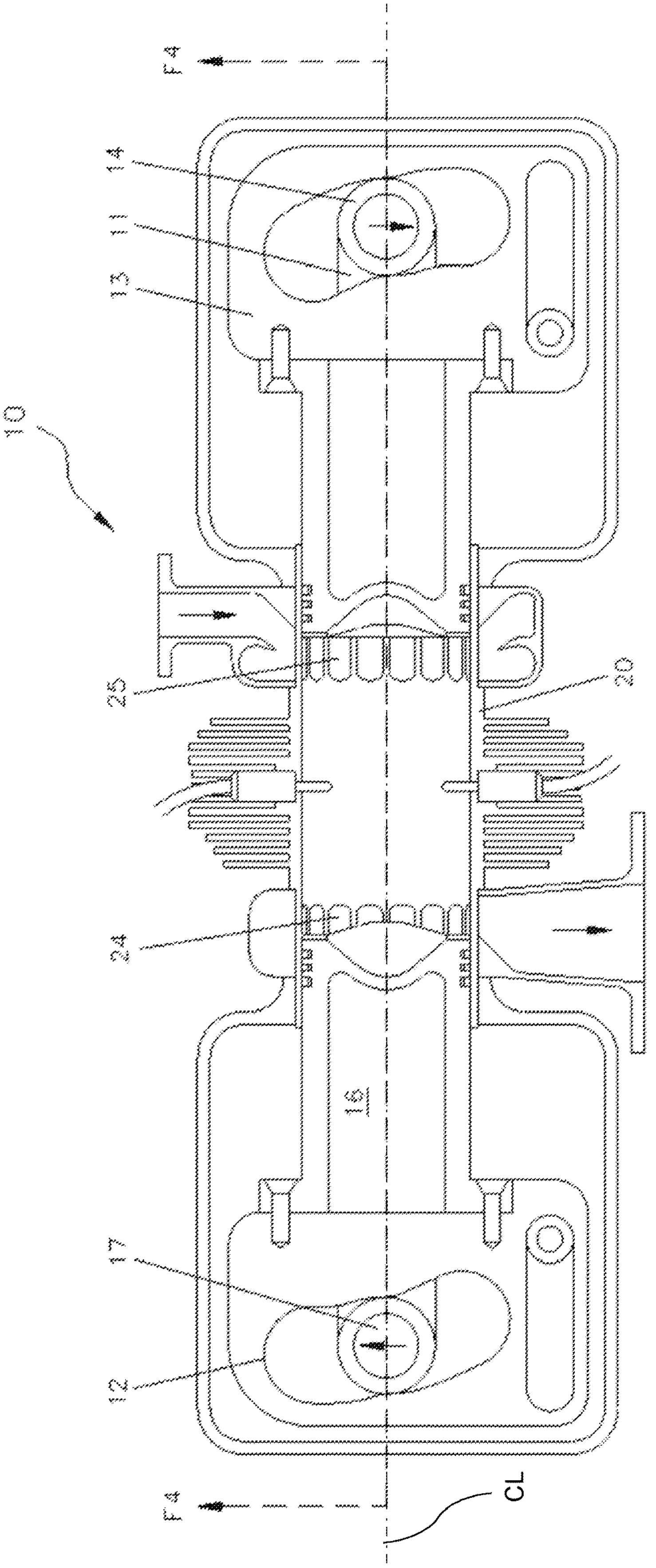
FIG. 1 is a cross-sectional front view depicting some of the internal components of an engine of a preferred embodiment, according to the present invention of a duel crank, opposed piston engine viewed in the direction of the rotational axis of the crankshafts with the pistons at the bottom of their stroke.

FIG. 1 is a front cross-sectional front view depicting the internal components of an opposed piston engine 10 according to the present invention. It is a preferred embodiment of the present invention which is similar to the second preferred embodiment shown in FIG. 3 of U.S. Pat. No. 10,287,971 except that the slots 12 in followers, for example yokes 13, where the bearings 14 ride are shaped differently. U.S. Pat. No. 10,287,971 is herein incorporated by reference.

Prior art scotch yokes have always had slots with straight sides perpendicular to their direction of motion which control the motion of their pistons in the conventional manor. In the present invention the different shaped slots 12 allow the pistons 16 to follow a much higher efficiency path. For example, the shape of the sides of the slots 12 allow the pistons 16 to stop or dwell at or very near the top and bottom of their stroke while the crankshaft 11 is turning.

FIG. 1 shows the pistons 16 at the bottom of their stroke with the crankshaft throws 17 and bearings 14 also at the bottom of their stroke ready to rapidly push the followers 18 and the pistons 16 to the top of their stroke.

Figure 2:
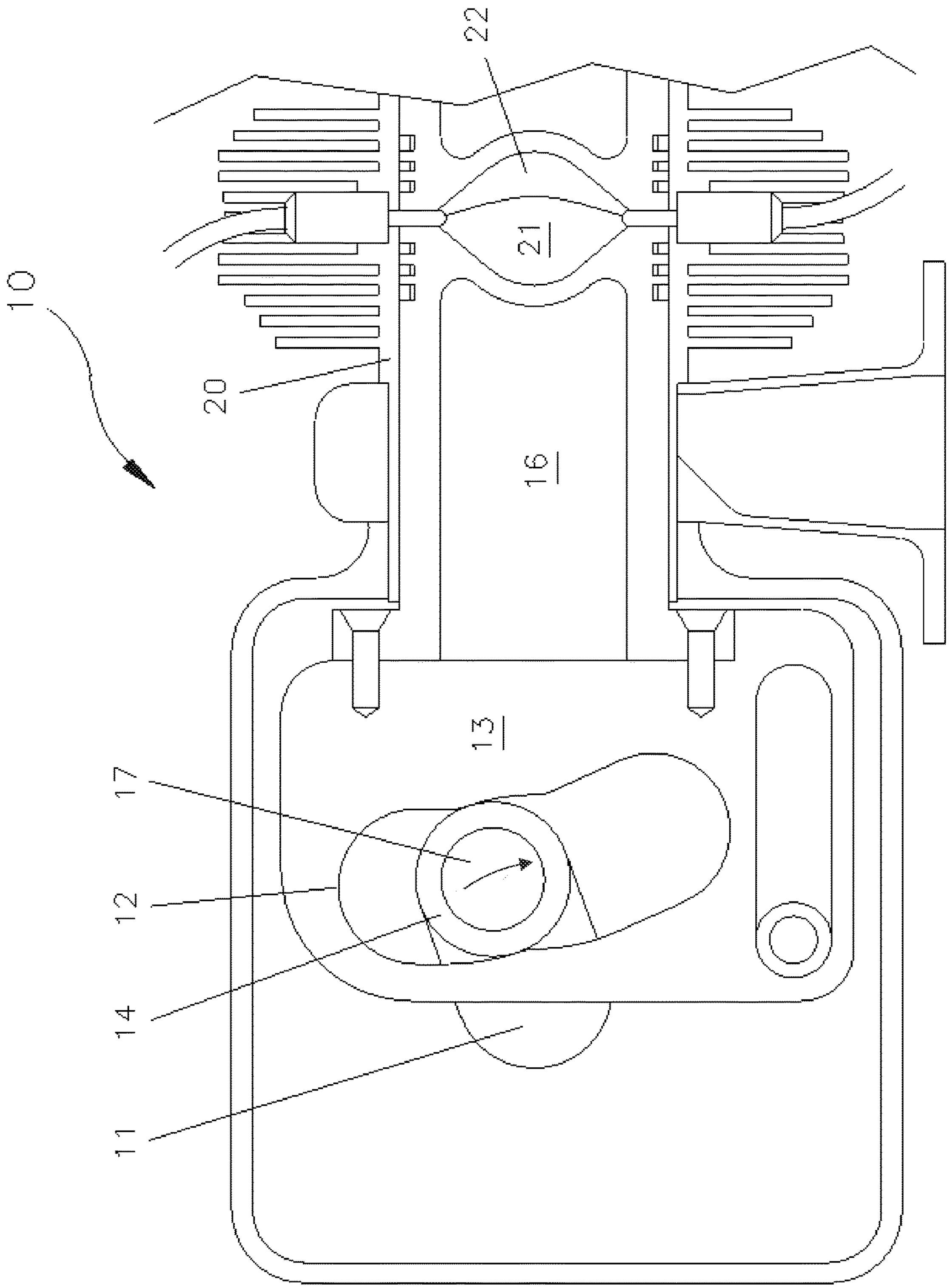
FIG. 2 shows the exhaust side of the engine with the pistons at the top of their stroke and the crank at about 20 degrees from the top of its stroke, due to the shape of the slot in the yoke.

FIG. 2 shows the same engine 10 in the same cross-section view as FIG. 1 except mainly the exhaust side of the cylinder 20 and the combustion chamber 21 with the pistons 16 at the top of their stroke and the crank throw 17 at about twenty degrees from the top of its stroke do to the shape of the side of the slot 12 in the yokes 13, or for about 30 degrees of crankshaft rotation. The pistons 16 will remain at the top of their stroke until the crank throws 17 reach the top of their stroke. This allows all of the fuel to be injected into and completely burned in the small combustion chamber 21 after the vortex has been created by the squish area 22. This reduces the heat loss and maintains the same high expansion ratio during the complete combustion process which increases the thermodynamic efficiency. The added pressure on the piston 16 from the burning fuel before the crank throws 17 reach the top of their stroke is transmitted to the follower 18. But because of the shape of the slots 12 in the yokes 13, the followers 18 push on the bearing 14 in the plane of the axis of rotation of the crankshaft 11. This eliminates the normal state of the art reverse torque on the crankshaft 11 during the first part of the burning cycle. All prior art IC engines that burn fuel before the pistons reach the top of their stroke create reverse torque on the crankshaft and loss of power and efficiency.

Figure 3:
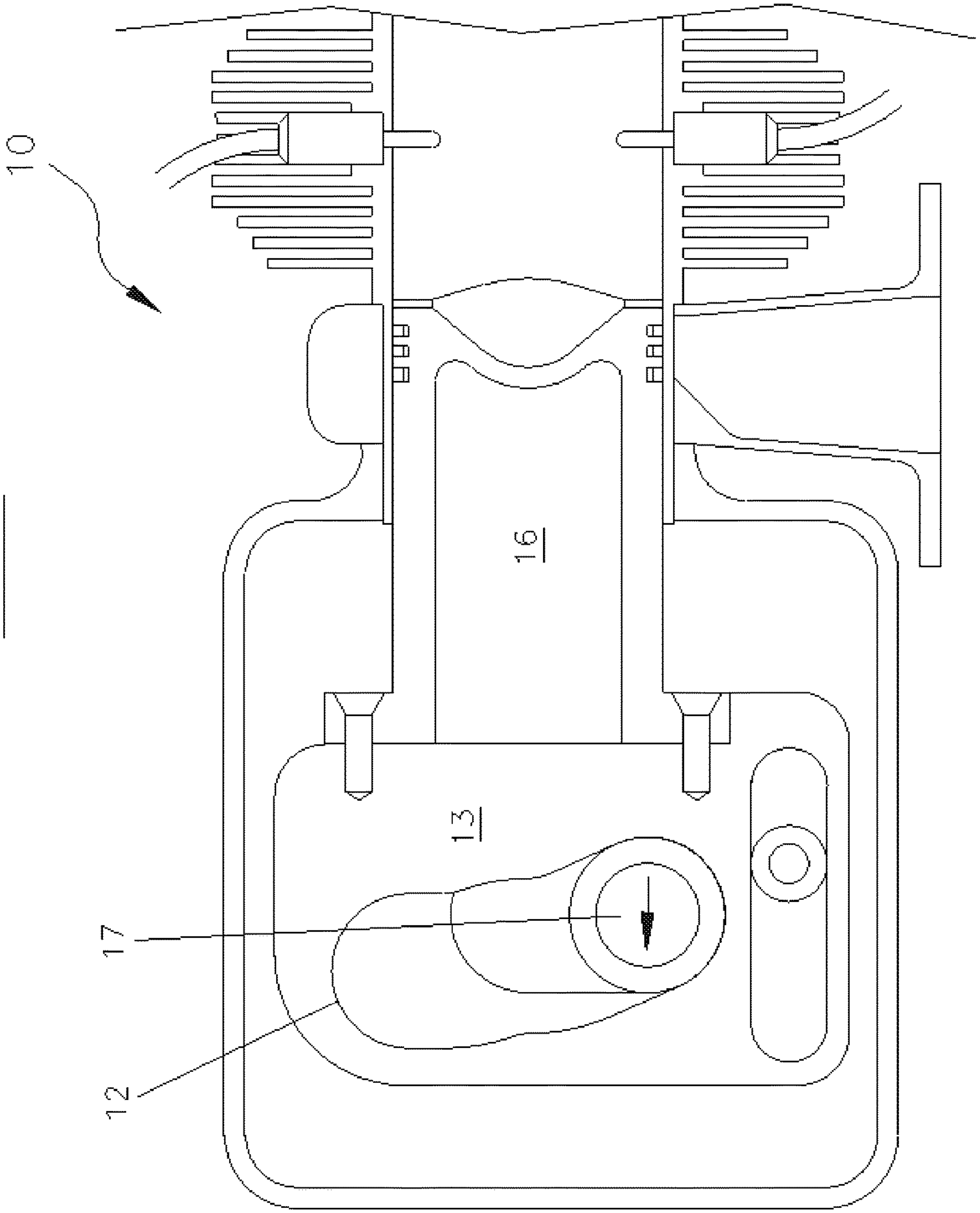
FIG. 3 shows the engine with the crank throw moved half way down but the piston has rapidly moved down almost to the end of its stroke.

FIG. 3 is similar to FIG. 2 except that the crank throws 17 have reached the middle of their stroke but the pistons 16 are almost at the end of their power stroke do to the shape of the sides of the slots 12 in the yokes 13. The quick acceleration of the pistons 16 at the beginning of the power stroke where the temperature is the highest greatly reduces the heat lost and increases the efficiency. A piston spring 16*a* resides between the yokes 13 and pistons 16.

With this new technology the length of the power stroke can be increased a little by shortening the exhaust ports 24 and the intake ports 25, shown in FIG. 1, because with the new technology, the time at the bottom of the piston stroke for breathing will be increased just like it is at the top for burning. The timing of the opening and closing of the intake 25 and exhaust ports 24 with respect to each other can also be adjusted because the shape of the slots 12 in the yokes 13 do not have to be exactly the same on both sides of the engine 10.

Figure 4:
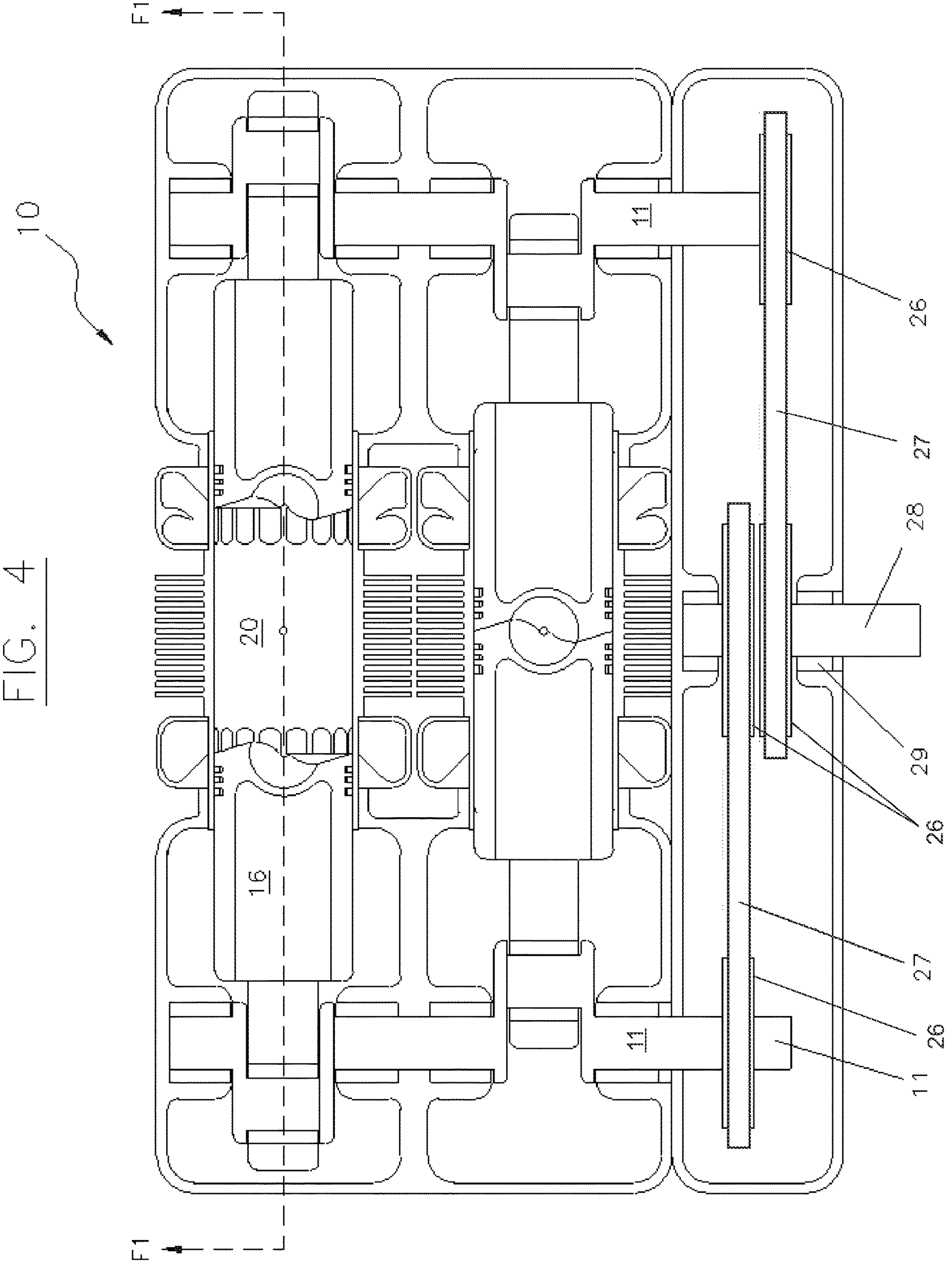
FIG. 4 is a cross-sectional top view depicting some of the internal components of the engine according to the present invention.

FIG. 4 is a cross-sectional top view of the two cylinder opposed piston engine 10 according to the present invention. It has two crankshafts 11, one on each side of the engine 10 and a set of pulleys or gears 26, bearings 29, and silent chains or belts 27 to keep the crankshafts 11 synchronized and provide a single output shaft 28. The pistons 16 are in Beginning Of Stroke (BOS) in the top one of the cylinders 20 and in End Of Stroke (EOS) in the bottom one of the cylinders 20. The engine 10 fires twice for every revolution of the crankshafts 11.

Figure 5:
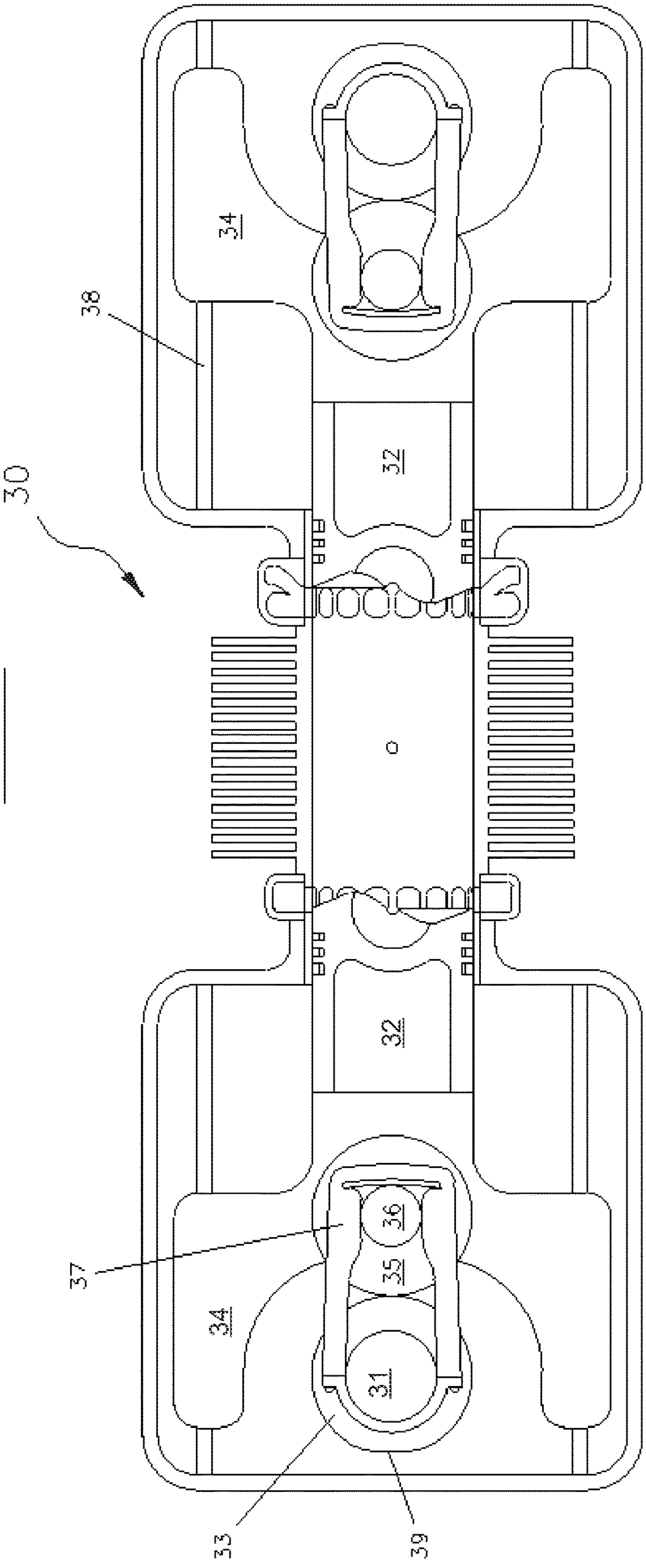
FIG. 5 is a cross-sectional front view depicting some of the internal components of the engine according to the present invention with the pistons at the bottom of their stroke.

FIG. 5 is a cross-sectional front view depicting some of the internal components of a preferred embodiment of another configuration of an opposed piston engine 30 according to the present invention with the pistons 32 at the bottom of their stroke. Engine 30 performs the same function as engine 10 of FIG. 1 by holding the pistons 32 together while the fuel is burning and increasing the speed of the power stroke, but by different mechanical means. The pistons 32 are rigidly connected to the cam follower housings 34 which hold the circular roller followers 35 in place with follower pins 36 and the followers 35 roll on cams 33 which are part of a cammed crankshaft 31 (see FIG. 8) having cammed throws 99. The cams 33 are about the same size as the followers 35 and are circular except for about thirty degrees of their circumference 39 which has the right, larger radius to hold the pistons 32 together while the fuel is burning. The housings 34 are guided on the rods 38 and the spring retainers 37 connect cam lobe journals 98 to the follower pins 36 to hold the followers 35 on the cams 33 at all times.

Figure 6:
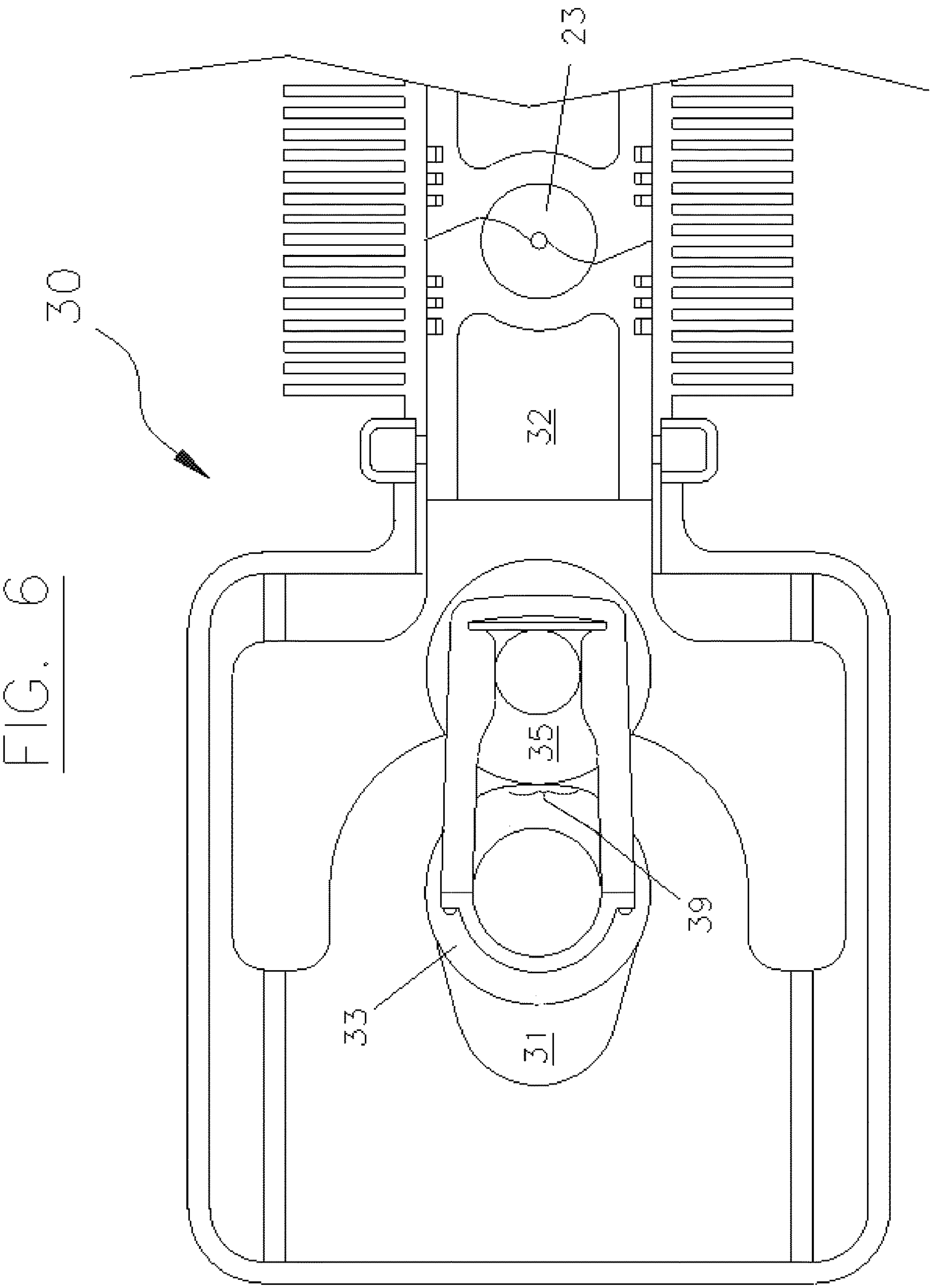
FIG. 6 shows the combustion chamber and the exhaust side of the engine with the pistons at the top of their stroke and how they stay together for over twenty degrees of rotation of the power shafts.

FIG. 6 is the same as FIG. 5 except that it shows the combustion chamber 23 and the exhaust side of the engine 30 with the pistons at the top of their stroke. The larger radius portion 39 of the cams 33 is about the same size as the diameter of the cams 33 and the center of the circular portion of cams 33 is offset from the center of rotation of the cammed crankshafts 31 by the length of the radius of the cams 33. This configuration keeps the pistons 32 together while the followers 35 are on the larger radius 39 of the cams 33 and makes the stroke of each piston 32 equal to about the diameter of each cam 33.

Figure 7:
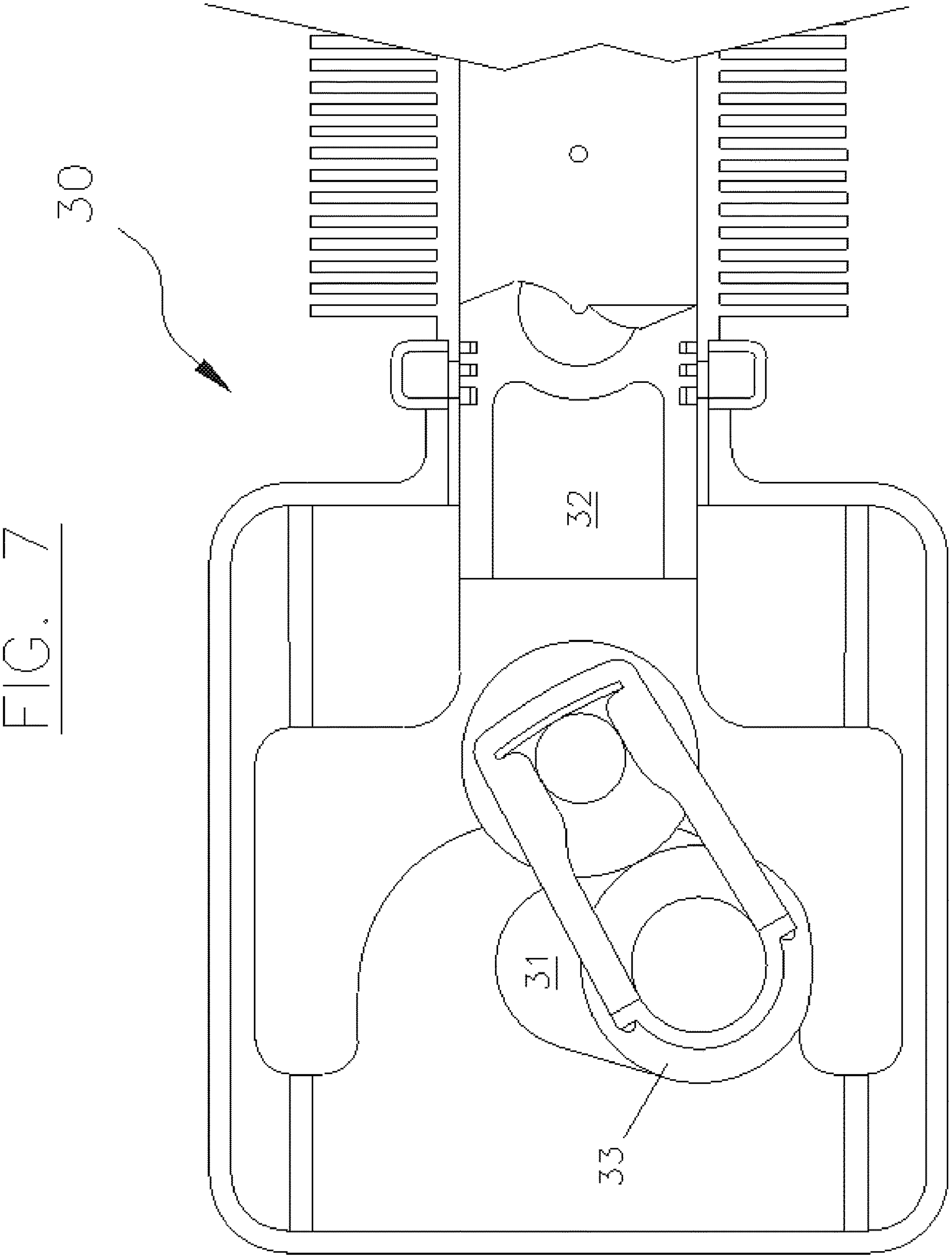
FIG. 7 is the same as FIG. 6 except that it shows the power shaft rotated only half way down with the piston much more than half way down to the bottom of its stroke.

FIG. 7 is the same as FIG. 6 except that it shows the cammed crankshafts 31 and the cam 33 rotated only half way down their stroke with the piston 32 further down to the bottom of its stroke. The cams 33 could be shaped a little different to bring the pistons 32 down even quicker.

Figure 8:
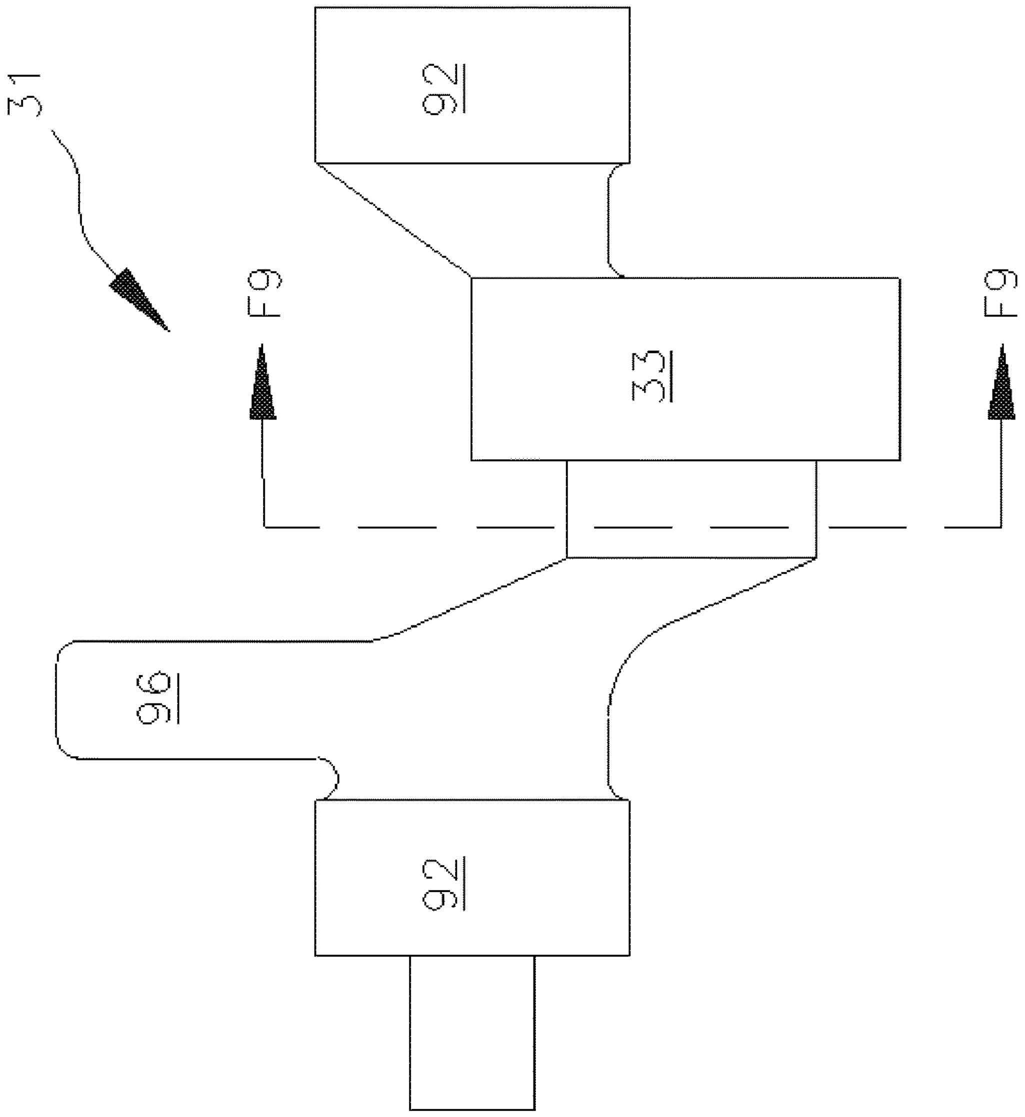
FIG. 8 is a side view of a preferred embodiment according to the present invention of one of the power cam shafts in a single cylinder configuration of the engine in FIG. 5.

FIG. 8 is a side view of a preferred embodiment according to the present invention of one of the cammed crankshafts 31 in a single cylinder configuration of the engine in FIG. 5. There are two main journals 92, a cam 33, and a counter weight 96 to balance the cam med crankshafts 31.

Figure 9:
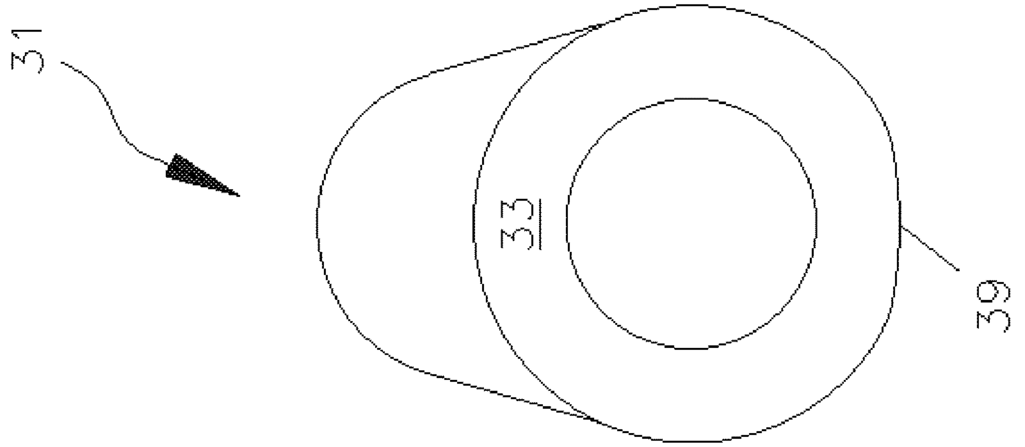
FIG. 9 is an end cross-sectional front view of the power cam shaft in FIG. 8 depicting the shape of the power cam and its location on the power cam shaft.

FIG. 9 is a cross-sectional end view of the cammed crankshafts 31 in FIG. 8 taken perpendicular to its axis of rotation. It shows the almost cylindrical shape of the cam 33 except for the larger radius portion 39 that keeps the pistons 32 together while the fuel is burning.

Figure 10:
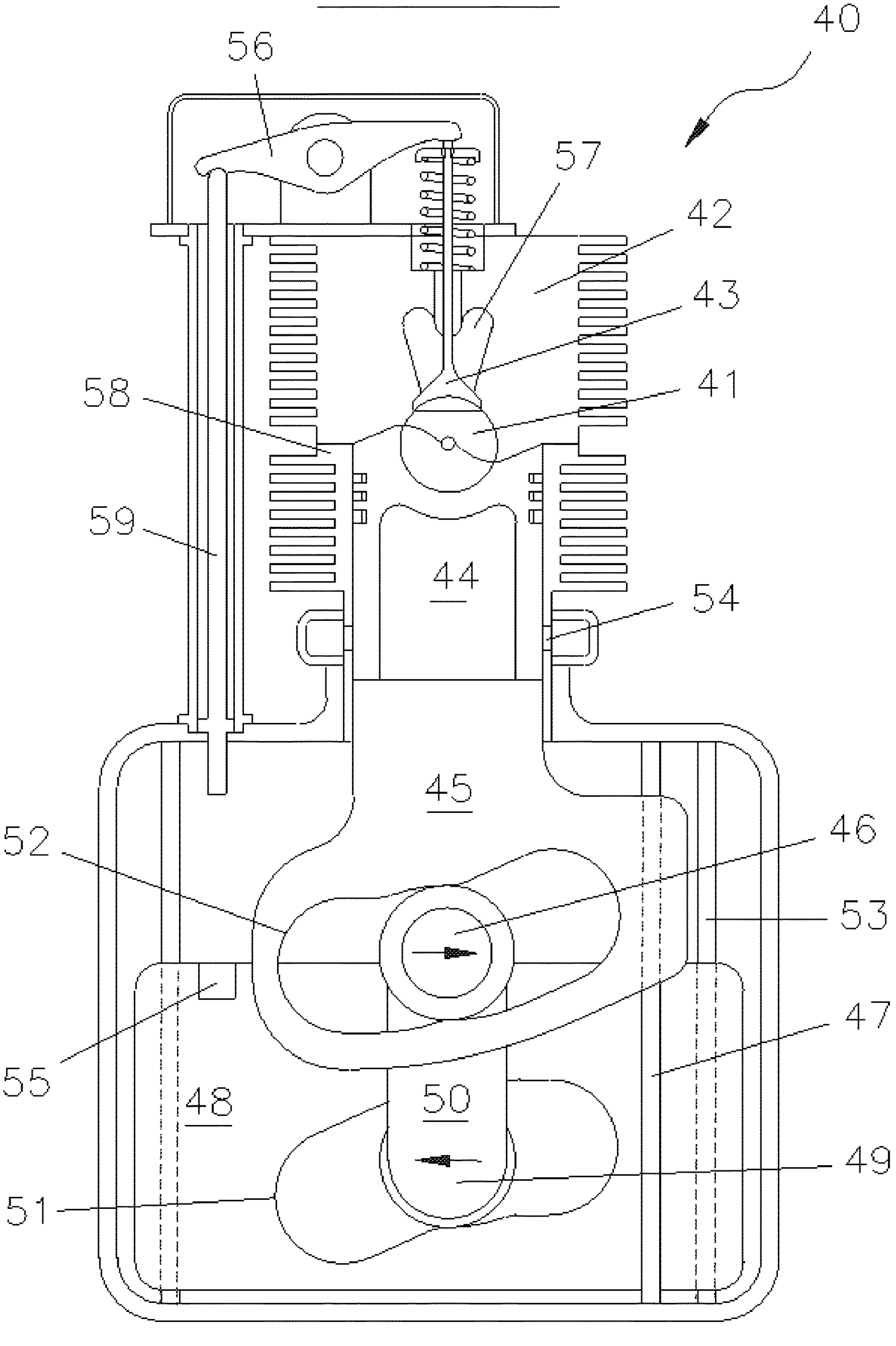
FIG. 10 is a front cross-sectional front view depicting some of the internal components of a preferred embodiment according to the present invention of a single piston engine with the piston at the top of its stroke.

FIG. 10 is a cross-sectional front view depicting some of the internal components of a preferred embodiment according to the present invention of a single piston 44 engine 40 with the piston at the top of its stroke. It has almost the same shaped combustion chamber 41 as engine 10 in FIG. 2 and engine 30 in FIG. 6 except that one half of the chamber 41 is a head 42 with an intake valve 43 in the center. The piston 44 is operated with yoke 45 and a crank throw 46 just like engine 10, but the yoke 45 is guided by a rod 47. The counter weights 48 are operated by adjacent throws 49 on crank shaft 50 in the opposite direction at all times from the yoke 45 with the same shaped slots 51 in the counter weights 48 as in yoke 45. The counter weights 48 are guided on the rods 53.

Figure 11:
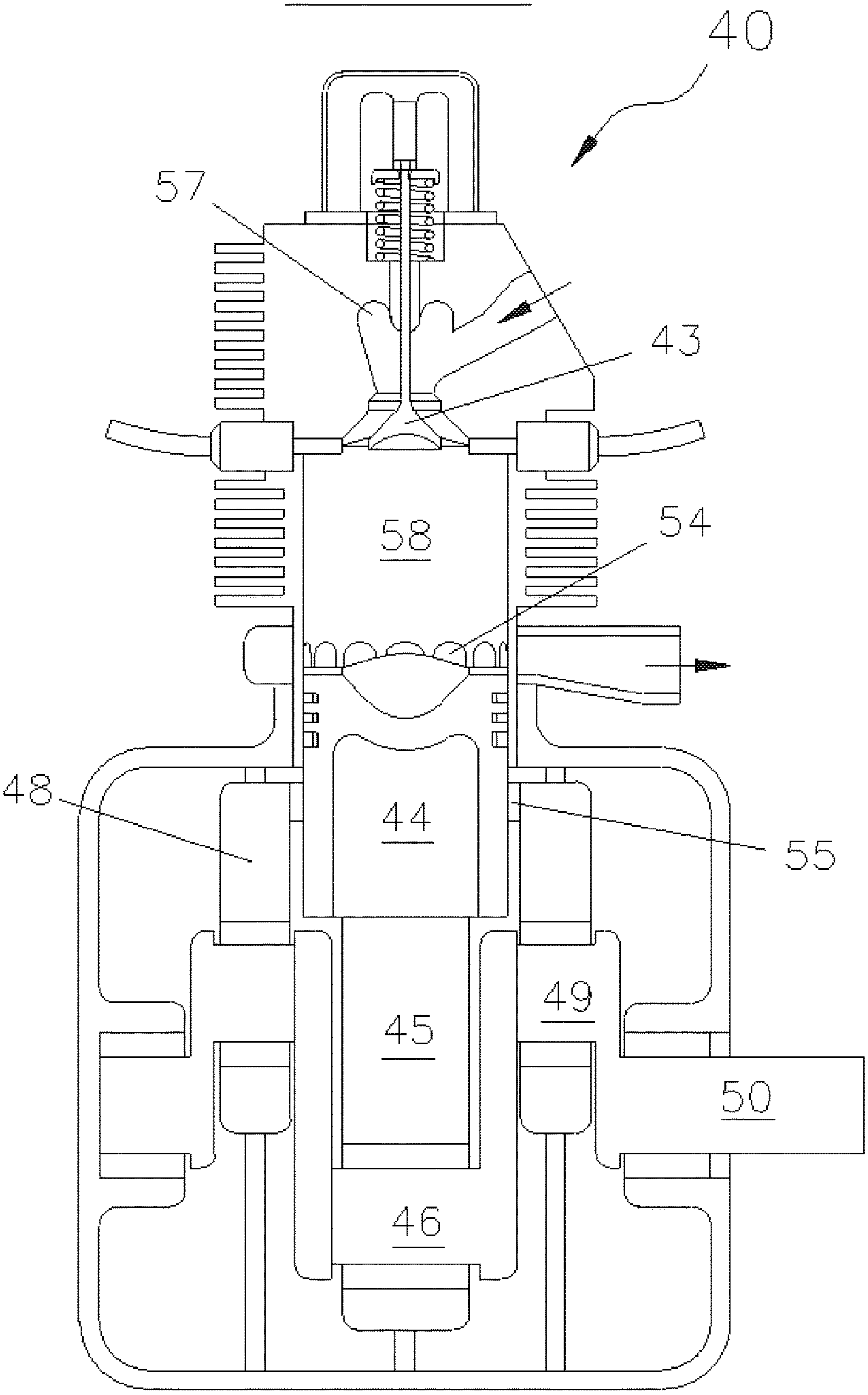
FIG. 11 is a side cross-sectional side view depicting the crankshaft and some of the internal components of the single piston engine shown in FIG. 10 with the piston at the bottom of its stroke.

FIG. 11 is a cross-sectional side view depicting some of the internal components of the engine 40 of FIG. 10 with the exhaust ports 54 and the intake valve 43 fully open and the fresh air being pulled into the cylinder 58 by the exhaust gases rushing out.

When the piston 44 is almost down far enough to uncover the exhaust ports 54 the cross bar 55 on the counter weights 48 move the push rod 59 up to open the intake valve 43 via the rocker arm 56. When the intake valve 43 opens the exhaust gas rushes into the gas hook 57 which turns it around and sends it back to escape out the exhaust ports 54. The slots 51 in the counter weights 48 and the diameter of the crank throws 49 could be made smaller and they would still have the same counter balancing effect.

Figure 12:
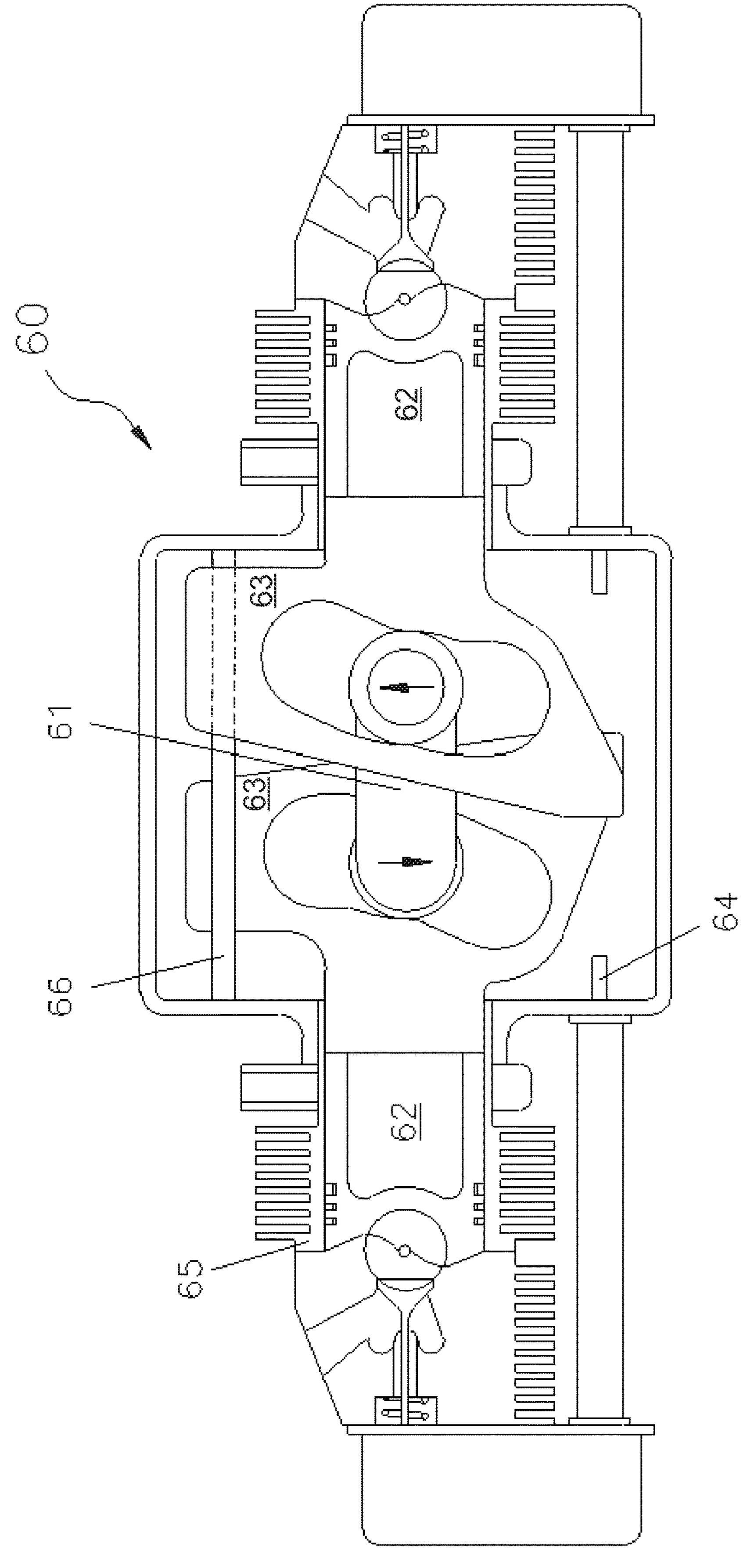
FIG. 12 is a front cross-sectional front view depicting some of the internal components of a preferred embodiment according to the present invention of a two or more cylinder pancake engine with the pistons at the top of their stroke.

FIG. 12 is a front cross-sectional view depicting some of the internal components of a preferred embodiment of a two or more cylinder pancake engine 60 according to the present invention, with the pistons 62 at the top of their stroke. It is the same as engine 40 in FIG. 8 except that there are two or more of them sharing the same crankshaft 61 with every other one of the pistons 62 moving in the opposite direction. Because the pistons 62 and yokes 63 counter balance each other there is no need for counter weights on the crankshaft 61, therefore the adjacent yokes 63 must operate the push rods 64 for the adjacent, opposite cylinder. Yokes 63 are guided on rods 66.

Figure 13:
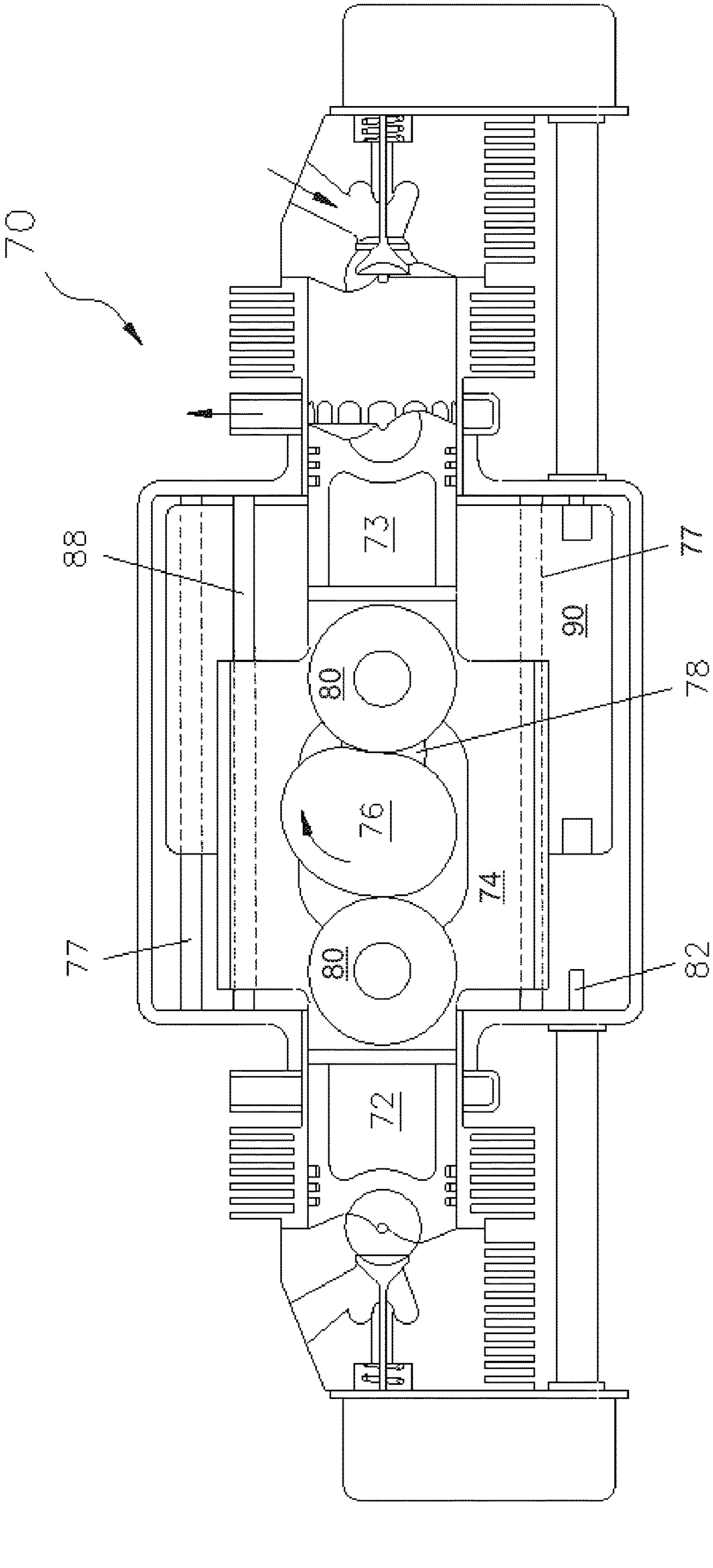
FIG. 13 is a cross-sectional front view depicting some of the internal components of a preferred embodiment according to the present invention of a two cylinder pancake engine with the two pistons rigidly connected and driven by a large cam on the power shaft. One of the pistons is shown at the top of its stroke and the other at the bottom.

FIG. 13 is a cross-sectional front view depicting some of the internal components of a preferred embodiment according to the present invention of a two cylinder pancake engine 70. One of the pistons 72 is shown at the top of its stroke and the other piston 73 at the bottom, because the two pistons 72 and 73 are rigidly connected together by the roller follower housing 74 and driven by a large cam 76 on the power shaft 78 (better shown in FIG. 12). The cam 76 is configured so that it is in contact, or very close to contact with the two roller followers 80 in all of its positions, and it holds one of the pistons 72 or 73 at the top and the other at the bottom of its stroke while the fuel is burning every half revolution of the power shaft 78. The counter weight 90 can be driven by the same configuration cam and followers (not shown) on the power shaft 78, but in the opposite direction which allows them to move the push rods 82 at the right time. The counter weight 90 is guided on the rods 77. The rest of the engine 70 is the same as engine 60 in FIG. 10.

Figure 14:
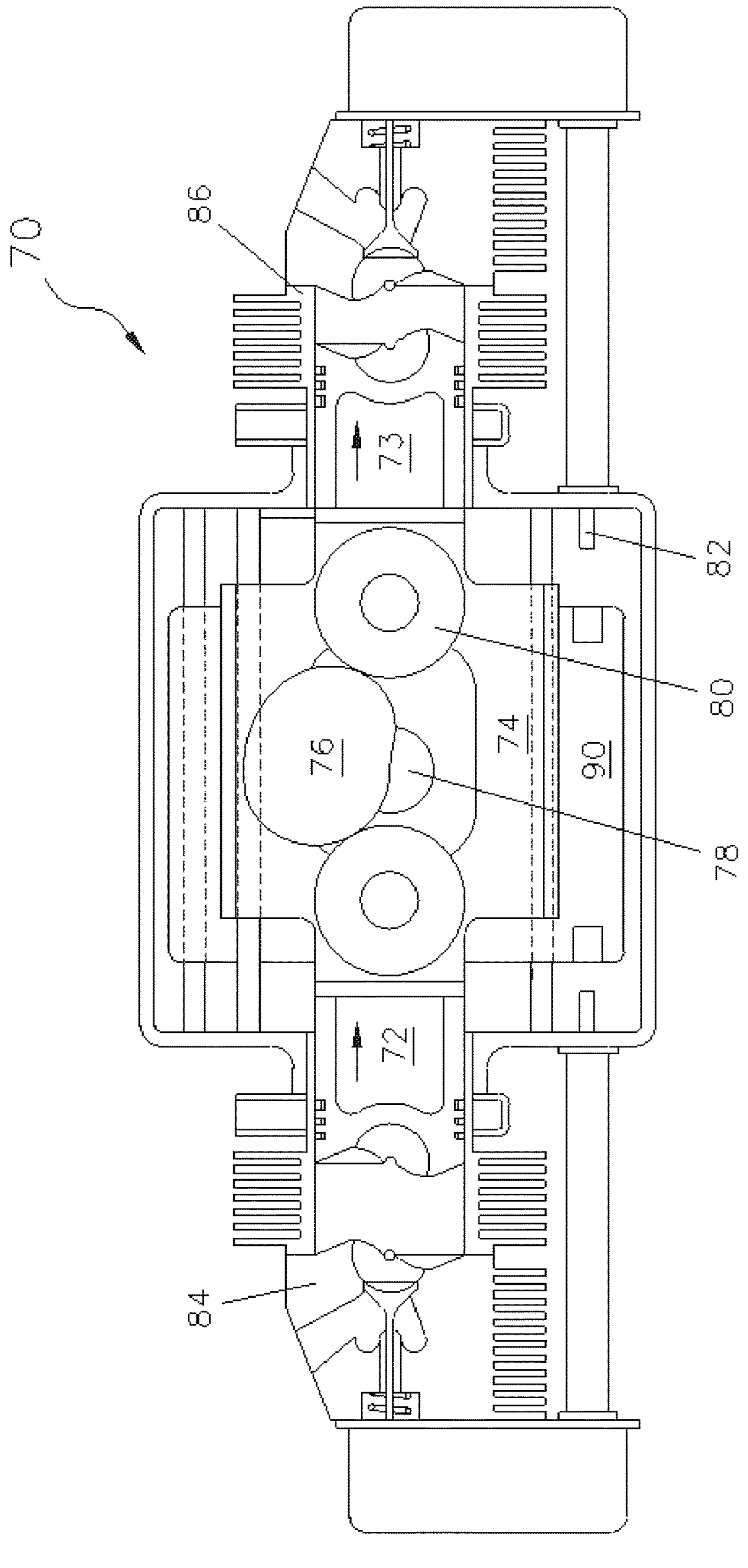
FIG. 14 is the same as FIG. 13 except that it shows the piston on the left about two thirds of the way through its power stroke but the cam has only been rotated about ninety degrees.

FIG. 14 is the same as FIG. 13 except that it shows the piston 72 on the left that remained at the top of its stroke while all of the fuel was burned is now about two thirds of the way through its power stroke but the cam 76 has only been rotated about ninety degrees from top dead center. This shows that the piston 72 traveled faster for the first half of its power stroke than it will for the last half. Under normal operating conditions this would cause the charge of hot gas to lose less heat through the head 84 and cylinder 86 increasing the efficiency and power of the cycle.

Figure 15:
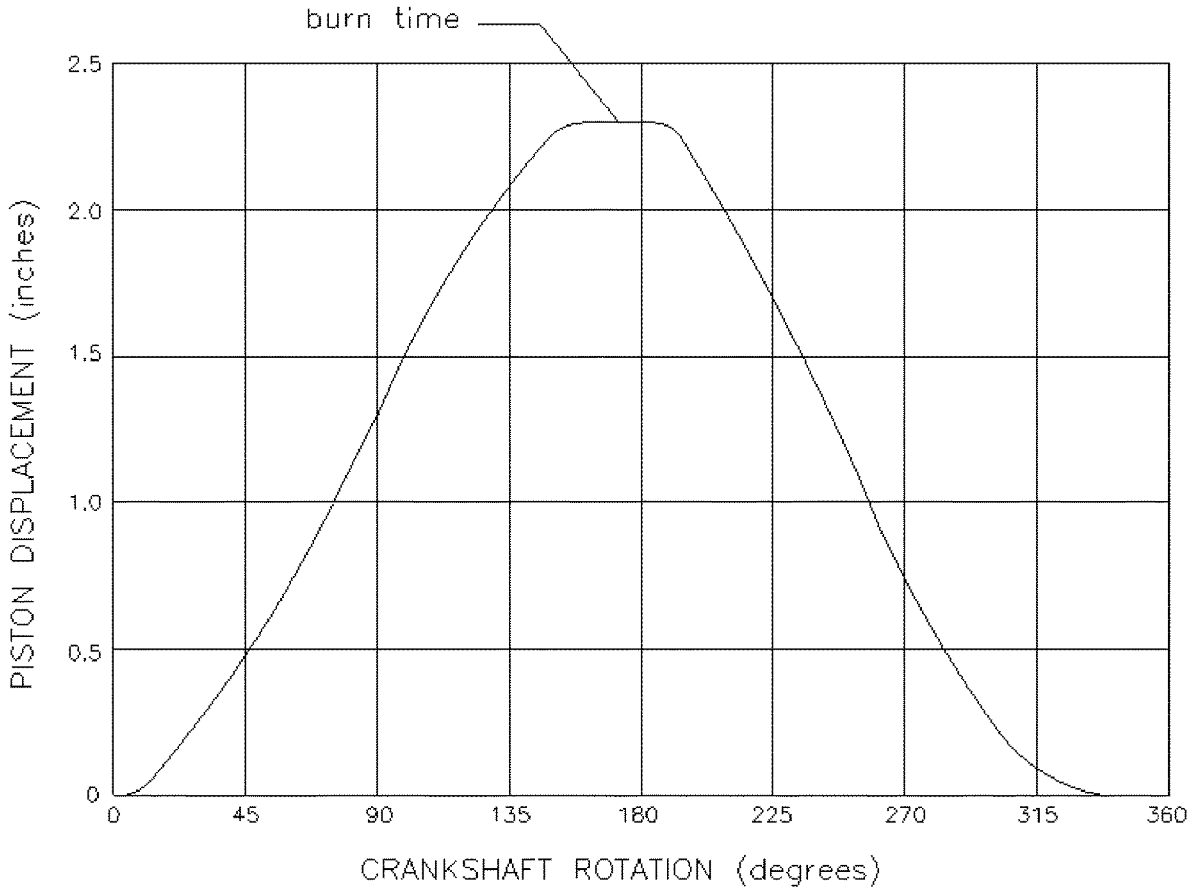
FIG. 15 is a graph of the piston displacement verses the crankshaft rotation in the engine of FIG. 1 which shows the delay of the piston at the top of its stroke for the burning of the fuel.

FIG. 15 is a graph of an ECO cycle of the present invention. The graph shows the displacement of the pistons 16 verses the rotation of crankshafts 17 in the engine 10 of FIG. 1. It shows the delay of the pistons 16 at the top of their stroke for the complete burning of the fuel and the delay at the bottom of their stroke for complete scavenging of the cylinder 20.

The preferred embodiment engines with the new ECO cycle of the present invention produce almost no harmful or hazardous emissions for a number of reasons. They are so efficient and powerful that only a small amount of fuel is needed for each power stroke. That small amount of fuel is completely burned into carbon dioxide in the small spherical combustion chamber provided by the pistons staying at the top of their stroke, for that small amount of time. The temperature in the combustion chamber never gets high enough to burn the nitrogen. NOx (burned nitrogen) and carbon monoxide are the most hazardous emissions that state of the art IC engines produce. That small amount of time in the small chamber is enough to burn almost all the carbon out to carbon dioxide, a harmless gas.

While the invention herein disclosed has been described by means of specific embodiments and applications thereof, numerous modifications and variations could be made thereto by those skilled in the art without departing from the scope of the invention set forth in the claims.

I claim:

1. A thermodynamic cycle of operation of internal combustion engines, the improvement comprising:
- coupling at least one piston to at least one crankshaft by at least one follower fixedly attached to the at least one piston and translating with the at least one piston;
- the at least one follower in intimate contact with the at least one crankshaft converting rotation of the at least one crankshaft to linear motion of the at least one piston; and
- the cooperation of the at least one crankshaft and the at least one follower holding the at least one piston at or near End of Stroke (EOS) longer than a convention internal combustion engine.

2. The thermodynamic cycle of claim 1, where holding the at least one piston at or near EOS comprises holding the at least one piston at or near EOS for the entire time that fuel is burning.

3. The thermodynamic cycle of claim 1, where holding the at least one piston at or near EOS comprises holding the at least one piston at or near EOS for about 30 degrees of crankshaft rotation.

4. The thermodynamic cycle of claim 1, wherein the follower is a scotch yoke and the thermodynamic cycle further including:

a slot in the scotch yoke cooperating with a throw of the at least one crankshaft to convert rotational motion of the crankshaft to liner motion of the at least one piston; and the slot in the scotch yoke is shaped causing the at least one piston to stay near EOS longer than the convention internal combustion engine.

5. The thermodynamic cycle of claim 1, wherein:

the at least one crankshaft is a cammed crankshaft including at least one cammed throw;

the at least one follower is at least one cam follower each including a cam follower housing fixedly attached and translating with the at least one piston;

each the at least one cam follower is coupled to one of the at least one cams by a corresponding retainer, wherein the at least one cam med throw is shaped causing the at least one piston to stay at or near EOS longer than the convention internal combustion engine.

6. The thermodynamic cycle of claim 5, further including the at least one cam follower intimately contacting a corresponding one of the at least one cam med throw.

7. The thermodynamic cycle of claim 5, wherein each of the at least one cam follower includes a roller cam follower rotationally mounted to the at least one cam follower housing, the roller cam follower residing against the at least one cam.

8. The thermodynamic cycle of claim 5, wherein:

a cam journal resides generally co-axial with each of the at least one cam; and the corresponding retainer connects the cam journal to the corresponding one of the at least one cam follower.

9. The thermodynamic cycle of claim 1, wherein holding the at least one piston at or near EOS comprises holding the at least one piston at or near EOS for at least 10 degrees of crankshaft rotation.

10. A two stroke per cycle internal combustion engine comprising:

at least one cylinder having a centerline (CL);

at least one piston;

at least one follower fixedly attached to the at least one piston, the at least one follower translating with the at least one piston parallel with the centerline (CL) of the at least one cylinder;

at least one crankshaft coupled to the at least one piston by intimate contact of the at least one follower with the at least one crankshaft to push the at least one piston into the at least one cylinder during a compression stroke;

the at least one piston coupled to the at least one crankshaft by the at least one follower to rotate the at least one crankshaft during a power stroke; and wherein the coupling holds the at least one piston at or near End Of stroke (EOS) longer than a convention internal combustion engine.

11. The internal combustion engine of claim 10, wherein the coupling holds the at least one piston at or near EOS for at least 10 degrees of crankshaft rotation.

12. The engine of claim 10, wherein the follower is a scotch yoke, and further comprising:

a slot in the scotch yoke cooperates with at least one crankshaft throw to convert rotational motion of the crankshaft to liner motion of the at least one piston; and the slot in the scotch yoke is shaped to cause the at least one piston to stay near EOS longer than a convention internal combustion engine.

13. The engine of claim 12, further including:

one follower bearing resided around each of the at least one throw; and each follower bearing resides inside one of the slots in one of the scotch yoke.

14. An engine of claim 12, further comprising:

an opposed piston configuration having two crankshafts, the two crankshafts on opposite sides of the engine;

throws on each of the two crankshafts;

one of the at least one piston connected to each of the throws by one of the scotch yokes;

pairs of the at least one piston facing each other in each of the at least one cylinders, the pairs of the at least one piston traveling in opposite directions, when they are traveling;

the crankshafts being rotationally coupled to rotate at the same speed so that the pairs of the at least one piston in each cylinder always reach the EOS at the same time; and exhaust ports toward one end of each of the at least one cylinders, and intake ports toward an opposite end of each of the at least one cylinders.

15. An engine of claim 12, further comprising:

at least one head with one spring loaded intake valve in each head over a top end of each cylinder and exhaust ports proximal to a bottom end opposite to the top end of each cylinder; and the head with the valve closed and the piston at the end of the compression stroke, forms an almost spherical combustion chamber with fuel injectors on each side between the head and the piston.

16. A two strokes per cycle, direct fuel oil injected, internal combustion engine comprising:

at least one cylinder;

at least one crankshaft;

at least one piston and follower;

a follower portion of the at least one piston and follower in intimate contact with the at least one crankshaft to couple rotation of the at least one crankshaft with translation of the a piston portion of the piston and follower translating within the at least one cylinder, wherein the cooperation of the at least one piston and follower with the at least one crankshaft holds the at least one piston portion at or near Top Dead Center (EOS) longer than a convention internal combustion engine.

17. The engine of claim 16, wherein the follower is a scotch yoke, and further comprising:

a slot in the scotch yoke cooperates with at least one crankshaft throw to convert rotational motion of the crankshaft to liner motion of the at least one piston; and the slot in the scotch yoke is shaped to cause the at least one piston to stay near EOS longer than a convention internal combustion engine.

18. An engine of claim 16, wherein:

the at least one crankshaft is a cammed crankshaft including at least one cammed throw;

the follower portion of the at least one piston and follower is a cam follower coupled to remain in contact with one of the at least one cam med throw;

the at least one cam med throw pushing the piston portion of the at least one piston and follower into the cylinder during the compression stroke;

the at least one piston and follower pushing against the cam med crankshaft during the power stroke to rotate the cam med crankshaft; and a shape of the at least one cam med throw holds the at least one piston portion at or near Top Dead Center (EOS) longer than a convention internal combustion engine.

19. An engine of claim 16, further comprising:

an opposed piston configuration having two crankshafts on opposite sides of the engine;

the at least one piston and followers comprises at least two pistons and followers;

the at least two pistons facing each other in each of the at least one cylinders and traveling in opposite directions, when the at least two pistons are traveling;

the two crankshafts rotationally coupled at the same speed so that the two pistons in each cylinder reach the end of their compression stroke at the same time; and the at least one cylinders includes exhaust ports toward one end of the cylinder and intake ports at an opposite end of the cylinder.

20. An engine of claim 16, further including:

at least one cylinder;

at least one head;

a spring loaded intake valve opening and closing intake ports in each of the at least one head over the end of each at least one cylinder;

exhaust ports each cylinder in ends of the at least one cylinder opposite to the intake ports; and the head with the valve closed and the at least one piston at the end of the compression stroke, forms an almost spherical combustion chamber with fuel injectors on each side between the head and the at least one piston and follower.

* * * * *